Dec. 29, 1959  W. A. WINGET  2,919,142
PUSHER CUP ATTACHMENT FOR TRACTORS
Filed Oct. 11, 1956  3 Sheets-Sheet 1

INVENTOR.
WILLIAM A. WINGET
BY
Malcolm W. Fraser
ATTORNEY

INVENTOR.
WILLIAM A. WINGET
BY Malcolm W. Fraser
ATTORNEY

Dec. 29, 1959 W. A. WINGET 2,919,142
PUSHER CUP ATTACHMENT FOR TRACTORS
Filed Oct. 11, 1956 3 Sheets-Sheet 3

INVENTOR.
WILLIAM A. WINGET
BY Malcolm W. Fraser
ATTORNEY

United States Patent Office 2,919,142
Patented Dec. 29, 1959

2,919,142

PUSHER CUP ATTACHMENT FOR TRACTORS

William A. Winget, Lima, Ohio

Application October 11, 1956, Serial No. 615,261

7 Claims. (Cl. 280—481)

This invention relates to pusher cup attachments for tractors and an object is to produce a sturdy and reliable attachment of this character which is yieldable to a limited extent thereby to militate against costly damage or breakage heretofore experienced either in connection with the pusher cup itself, the tractor U-frame, or the tractor drive mechanism, the pusher cup resiliently yielding upon being brought into engagement with a scraper-loader vehicle or the like without deleterious consequences.

Another object is to produce a pusher cup attachment having the new and improved feature of construction, arrangement and assembly hereinafter described.

For purposes of illustration but not of limitation embodiments of the invention are shown in the accompanying drawings in which—

Figure 1:
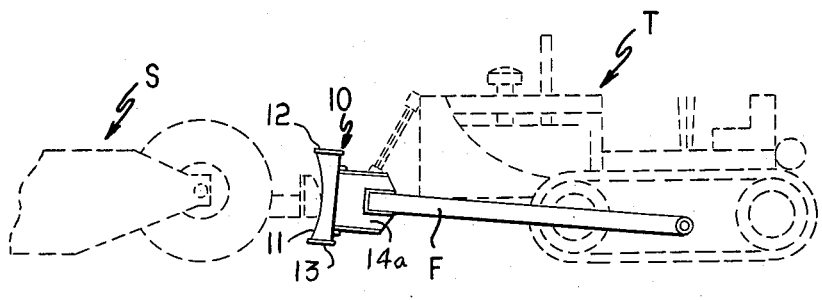
Figure 1 is a side elevation of a crawler driven tractor equipped with a pusher cup attachment on its U-frame, the pusher cup being shown in engagement with the rear end of a scraper-loader vehicle, only a portion of the latter being illustrated.

The illustrated embodiment of the invention comprises a crawler driven tractor T having at its front end the usual pivoted U-frame F. Detachably mounted on the cross member of the U-frame F is a pusher cup attachment 10 which in Figure 1 is shown in engagement with the rear end of a scraper-loader vehicle S. It will be understood that such power is required to propel the huge scraper-loader vehicle S that in addition to a tractor at the front of the scraper-loader, not infrequently additional power is required and this is supplied by a tractor at the rear of the scraper-loader imparting a pushing force to it. Thus a pusher cup is attached to the pivoted U-frame F and much difficulty has been experienced in connection with these attachments because of breakage and damage while they are in operation. This invention goes a long ways in overcoming such difficulties.

Figure 5:
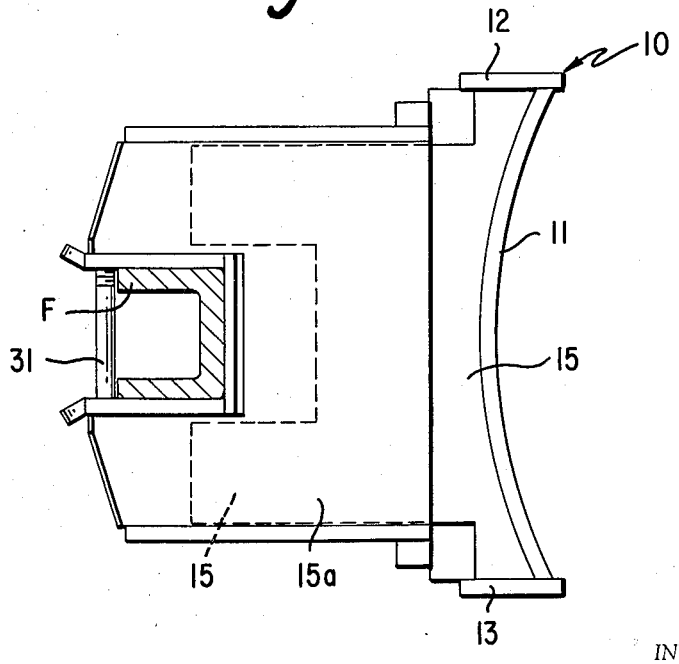
Figure 5 is a view on the line 5—5 of Figure 2 showing a side elevation of the pusher cup assembly.

As shown, the pusher cup attachment has at its front end a pusher plate 11 provided with a concave surface for engaging a bumper bar or the like at the rear end of the scraper-loader. Welded to the top of the pusher plate 11 and disposed in horizontal position is a plate 12 and a similar plate 13 is welded to the bottom edge of the pusher plate, these plates projecting rearwardly in substantial parallel planes. Welded to the rear face of the pusher plate 11, spaced inwardly from the opposite sides and conforming to the curvature of the rear face of the pusher plate are rearwardly extending guide plates 14 and 15. Each of the plates 14 and 15 is notched at its rear end, as indicated on Figure 5, so as not to interfere with the box-like frame (hereinafter described) which receives the cross portion of the tractor U-frame F. The guide plate 14 projects into a box-like housing 14a and the guide plate 15 projects into a similar box-like housing 15a. These housings are fabricated from flat metal plates which are welded together and as shown they are closed except for a relatively narrow opening at the front to admit the respective guide plate. The side walls flare rearwardly and outwardly in opposite directions thereby to enable a slight amount of lateral angling of the pusher plate 11, such for example as indicated by broken lines on Figure 2. It will be manifest that the rear end portions of the guide plates 14 and 15 are free to move laterally within their respective housings but the front edge portion of each housing fits the respective guide plate to serve as a guide therefor.

A plurality of laterally spaced vertical web plates conform to and are welded to the rear face of the pusher plate 11, in this instance six of these plates being provided. In addition to their being welded to the pusher plate 11, these plates are also welded to the top and bottom plates 12 and 13. The pairs of vertically extending web plates 16 at opposite sides of the pusher plate are covered by plates 17 and 18 respectively which are welded in position. The center pair of web plates 16 extend rearwardly a greater distance than the other web plates, as shown on Figure 2, and welded to the outer edges of these plates is a flat plate 19 which covers approximately one-half of the respective webs. For further strengthening and stiffening the structure, horizontal web plates 20 are interposed between adjacent vertical web plates 16 and are welded thereto as well as to the rear face of the pusher plate 10.

Figure 3:
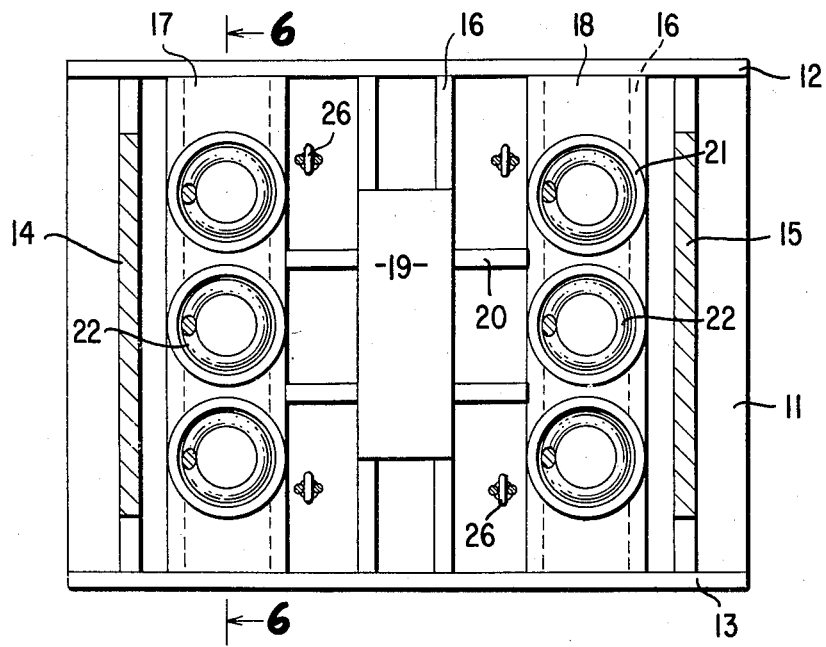
Figure 3 is a longitudinal sectional view on the line 3—3 of Figure 2.
Figure 4:
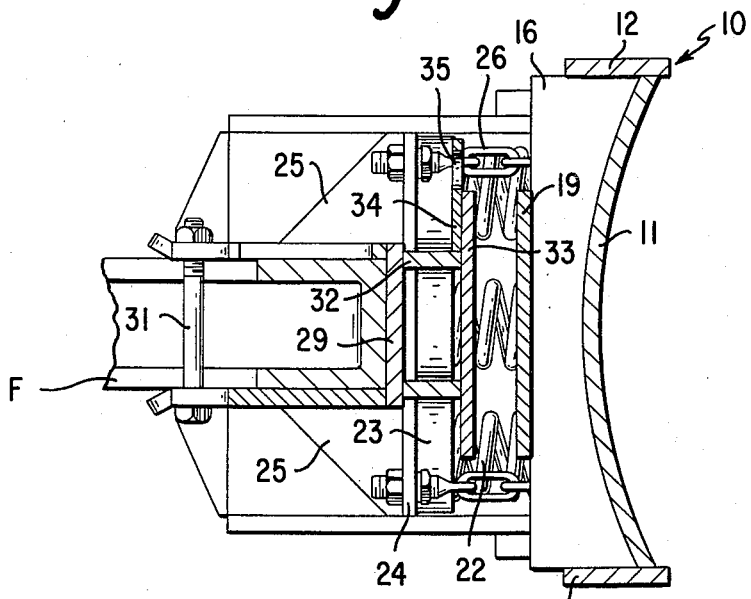
Figure 4 is a transverse sectional view on the line 4—4 of Figure 2.

Welded to the cover plates 17 and 18 are spring receiving cups 21 and in this instance three of such cups are welded to each of these plates, as shown on Figure 3. Arranged in each of the cups 21 is a coil spring 22, these springs extending rearwardly and entering similar cups 23 which are welded to vertical plates 24 respectively.

Limiting chains 26 are connected respectively to the plates 24 and the rear face of the pusher plate 11 and limit the movement of the parts away from each other as will be readily apparent.

Figure 2:
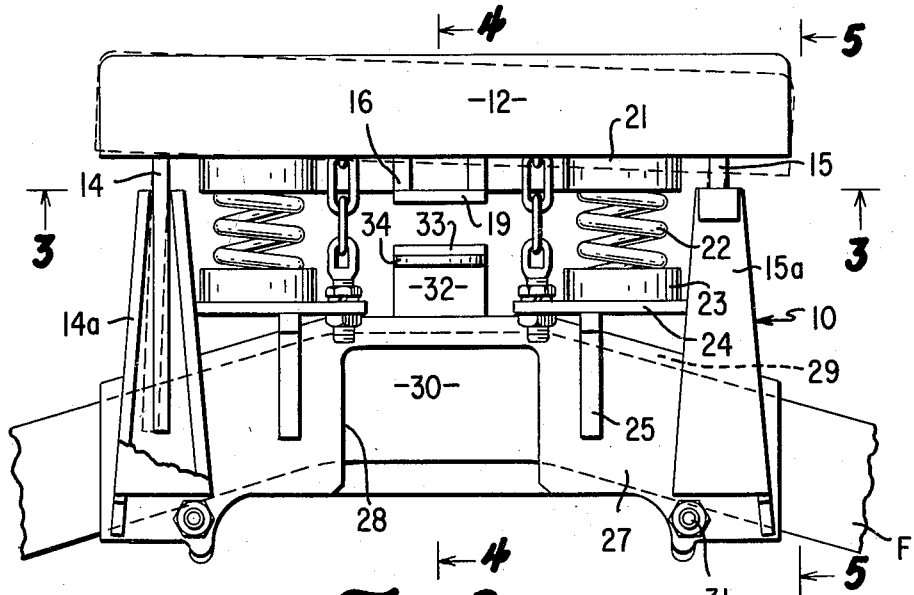
Figure 2 is an enlarged top elevational view of the pusher cup attachment showing the same mounted on the cross member of the tractor U-frame.

Vertical reinforcing webs 25 are welded to the rear faces of the vertical plates 24 and to the upper flat horizontal wall 27 of a U-shaped housing which conforms to and fits over the cross member of the tractor U-frame F. The housing has a front wall 29 which is welded to the front edge portion of the upper wall 27 and a bottom wall 30 welded to the front wall 29 and disposed parallel with the upper wall. It will be observed that the guide plate housings 14a and 15a are welded to the walls 27, 29 and 30 to afford an exceedingly rigid and sturdy structure. As shown particularly on Figure 2 a cut-out 28 is provided in the upper wall 27 of the U-frame engaging housing to clear any parts which are normally mounted on the tractor U-frame. As shown in Figure 2 the housing fits over the cross portion of the tractor U-frame F and bolt and nut assemblies 31 detachably secure the attachment in position.

Welded to the front wall 29 and projecting forwardly therefrom is a pair of vertically spaced plates 32, to the front end of which is welded an up and down plate 33, portions of which extend above and below the plates 32. As shown in Figure 2 these plates are directly in rear of the plate 19 which may abut thereagainst to limit the rearward movement of the pusher cup plate 11. Welded to the rear face of the plate 33 adjacent the upper of the plates 32 is a vertical plate 34 which has a hole 35 in its upper end. Through the hole 35 a hook may be extended to support the entire pusher cup assembly in order to mount it upon or remove it from the tractor U-frame.

From the above description it will be manifest that I have produced an exceedingly sturdy and rigid fabricated structure which is made up largely of plates, braces and struts which are welded together to provide an assembly which will withstand the sizeable forces imposed thereon. By making the pusher cup front portion separate from the rear portion and inttrposing the relatively stiff coil springs, a limited amount of yielding action can take place when the pusher cup is brought to bear against the scraper-loader vehicle. In the event that forces in excess of a predetermined maximum are encountered, the springs will yield and prevent damage or injury to the machines and associated parts.

Figure 7:
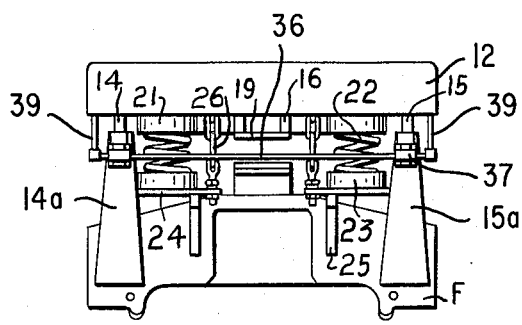
Figure 7 is a top plan view of an alternate form of pusher cup attachment, the same being equipped with an equalizer device.
Figure 8:
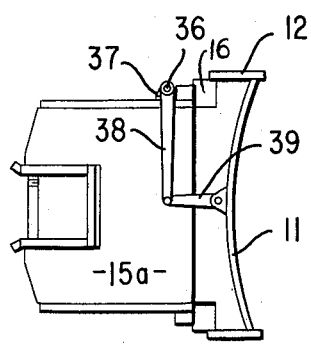
Figure 8 is a side elevation of the attachment shown on Figure 7.
Figure 6:
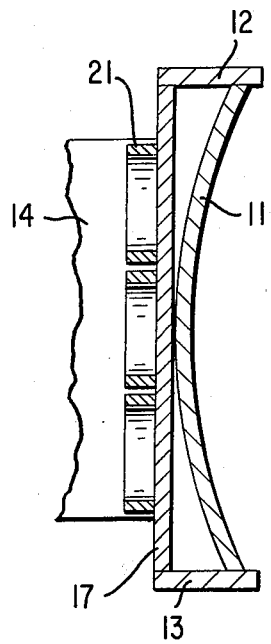
Figure 6 is a transverse sectional view on the line 6—6 of Figure 3.

Figure 7 and 8 show a pusher cup attachment as above described but with the addition of a longitudinally extending rock shaft 36 which is mounted in bearings 37 fixed to the top of the housings 14a and 15a. Fixed to the opposite ends of the rock shaft 36 are depending arms 38 respectively. The lower ends of the arms 38 are connected by links 39 to the rear face of the cup plate 11. This arrangement is such that in the event one side of the pusher cup is forced inwardly tending to dispose the pusher cup at an angle then the opposite side of the pusher cup will similarly be moved rearwardly, thereby at all times equalizing the pusher cup in spite of forces applied against one side or the other of the cup blade.

Numerous changes in details of construction, arrangement and choice of materials may be effected without departing from the spirit of the invention, especially as defined in the appended claims.

What I claim is:

1. A pusher cup attachment for tractor U-frames comprising a mounting member for attachment to the tractor U-frame, a pusher cup member having limited movement toward and away from said mounting member, a pair of guide plates rigid with opposite end portions of said pusher cup member and projecting rearwardly therefrom, a pair of guide boxes rigid with said attachment member for receiving said plates respectively, each box having a mouth closely fitting the respective plate and an outwardly and rearwardly flared body to afford angling of the pusher cup member relative to the attachment member, and cushioning means interposed between said members for yieldingly resisting rearward movement of said pusher cup member.

2. A pusher cup attachment for tractor U-frames comprising a mounting member for attachment to the tractor U-frame, a pusher cup member having limited movement toward and away from said mounting member, means for limiting the relative movement of said members, a pair of guide plates rigid with opposite end portions of said pusher cup member and projecting rearwardly therefrom, a pair of guide boxes rigid with said attachment member for receiving said plates respectively, each box having a mouth closely fitting the respective plate and an outwardly and rearwardly flared body to afford angling of the pusher cup member relative to the attachment member, and cushioning means interposed between said members for yieldingly resisting rearward movement of said pusher cup member .

3. The assembly as claimed in claim 2 in which the pusher cup comprises a concave pusher plate, a series of vertical laterally spaced ribs on the rear face of said plate, a pair of flat plates fixed to adjacent pairs of ribs respectively, a vertical series of cups on each of said plates, a second pair of flat plates rigidly fixed to said attachment member and correspondingly arranged to said flat plates, a vertical series of cups on each of said last flat plates, and spring elements socketed in the cups respectively.

4. A pusher cup attachment for tractor U-frames comprising a mounting member for attachment to the tractor U-frame, a pusher cup member having limited translatory sliding movement toward and away from said mounting member, cushioning means interposed directly between said members for cushioning the rearward movement of the pusher cup member, and equalizer means to cause said pusher cup member to move straight rearwardly and militate against tilting thereof, said equalizer means comprising a longitudinal shaft, bearings for the end portions of said shaft carried by the mounting member, an arm rigidly attached to and extending from each end of said shaft and depending therefrom, and a rigid link pivotally connecting the lower end of each arm to the adjacent end portion of the pusher cup member.

5. A pusher cup attachment for tractor U-frames comprising a mounting member for attachment to the tractor U-frame, said mounting member comprising a rigid fabricated plate structure open at its rear end to fit over the cross member of the tractor U-frame, fasteners to secure said structure in place, a pusher cup member of fabricated plate structure in advance of the mounting member, guide means including up and down plate elements rigid with one member and socket elements rigid with the other member for receiving the plate elements respectively whereby said socket elements are so shaped to enable to and fro movement of the cup member relative to the U-frame and simultaneously resist transverse movement thereof relative to the U-frame, and cushioning means independent of said guide means for resiliently cushioning the rearward movement of the cup member.

6. A pusher cup attachment for tractor U-frames comprising a mounting member for rigid attachment to the front horizontal portion of the tractor U-frame, a pusher cup member in front of the mounting member and having translatory shifting movement forwardly and rearwardly relative to the mounting member, cooperative guide elements on the mounting and pusher cup members so shaped and arranged to guide said shifting movement of the cup member relative to the mounting member, enable limited pivotal movement about a vertical axis of the pusher cup member, and to block transverse movement of the cup member with respect to the mounting member, and cushioning means between the cup member and the mounting member for resiliently resisting movement of the cup member toward the mounting member.

7. A pusher cup attachment for tractor U-frames, as defined in claim 6 wherein said cooperative guide means comprises male and female members and arranged in pairs at opposite end portions of said mounting member and said pusher cup member, respectively.

References Cited in the file of this patent

UNITED STATES PATENTS

| | | |
|---|---|---|
| 1,456,281 | Rogers | May 22, 1923 |
| 1,977,817 | Bird | Oct. 23, 1934 |
| 2,247,664 | Osman | July 1, 1941 |
| 2,587,208 | Peterson | Feb. 26, 1952 |
| 2,642,294 | Holm | June 16, 1953 |